(12) United States Patent
Yu et al.

(10) Patent No.: US 10,712,457 B2
(45) Date of Patent: Jul. 14, 2020

(54) MICROFABRICATION TECHNOLOGY FOR PRODUCING SENSING CELLS FOR MOLECULAR ELECTRONIC TRANSDUCER BASED SEISMOMETER

(71) Applicants: Hongyu Yu, Chandler, AZ (US); Hai Huang, Sunnyvale, CA (US)

(72) Inventors: Hongyu Yu, Chandler, AZ (US); Hai Huang, Sunnyvale, CA (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 343 days.

(21) Appl. No.: 15/037,449

(22) PCT Filed: Nov. 20, 2014

(86) PCT No.: PCT/US2014/066504
§ 371 (c)(1),
(2) Date: May 18, 2016

(87) PCT Pub. No.: WO2015/077394
PCT Pub. Date: May 28, 2015

(65) Prior Publication Data
US 2016/0291176 A1  Oct. 6, 2016

Related U.S. Application Data

(60) Provisional application No. 61/906,459, filed on Nov. 20, 2013.

(51) Int. Cl.
*G01V 1/18* (2006.01)
*G01H 11/06* (2006.01)
*G01P 13/00* (2006.01)

(52) U.S. Cl.
CPC ............... *G01V 1/18* (2013.01); *G01H 11/06* (2013.01); *G01P 13/00* (2013.01)

(58) Field of Classification Search
CPC ............ G01V 1/18; G01P 13/00; G01H 11/06
See application file for complete search history.

(56) References Cited

U.S. PATENT DOCUMENTS 4,996,627 A * 2/1991 Zias ...................... G01L 9/0042
205/656
7,645,615 B1 * 1/2010 Fritsch ................ B01F 13/0077
436/518
(Continued)

FOREIGN PATENT DOCUMENTS

CN    103048680      4/2013
WO    2007034409 A1  3/2007

OTHER PUBLICATIONS

Krishtop et al. (VG Krishtop, VM Agafonov, AS Bugaev, Technological principles of motion parameter transducers based on mass and charge transport in electrochemical microsystems, Russian Journal of Electrochemistry 48(7) (2012) 746-755). (Year: 2012).*
(Continued)

*Primary Examiner* — Maris R Kessel
*Assistant Examiner* — Joshua L Allen
(74) *Attorney, Agent, or Firm* — Quarles & Brady LLP (57) ABSTRACT

The invention relates to microfabrication technology for producing sensing cells, for use, for example, in molecular electronic transducer (MET) based seismometers devices. In some aspects, a method for fabricating a sensing element is provided. The method includes providing a first wafer including a first substrate, a second substrate, and a first insulating layer between therebetween, etching a first fluid throughhole through the first substrate, the first insulating layer, and the second substrate, and coating the first substrate and second substrate with a first and second conductive
(Continued)

coating, respectively. The method also includes providing a second wafer including a third substrate, a fourth substrate, and a second insulating layer therebetween, etching a second fluid throughhole through the third substrate, the second insulating layer, and the fourth substrate, and coating the third substrate with a third conductive coating from top and the fourth substrate with a fourth conductive coating from back.

20 Claims, 7 Drawing Sheets

(56) References Cited

U.S. PATENT DOCUMENTS

| | | | |
|---|---|---|---|
| 8,051,713 | B2 | 11/2011 | De Boer et al. |
| 9,300,409 | B1* | 3/2016 | Leugoud .................. G01V 1/18 |
| 2003/0029719 | A1* | 2/2003 | Abramovich ........... G01P 1/023 |
| | | | 204/252 |
| 2005/0257616 | A1* | 11/2005 | Kozlov ................. G01P 15/006 |
| | | | 73/514.16 |
| 2006/0117551 | A1 | 6/2006 | Baumgartner et al. |
| 2007/0140514 | A1 | 6/2007 | Pedersen |
| 2008/0216571 | A1* | 9/2008 | Kozlov ................. G01P 15/006 |
| | | | 73/514.09 |
| 2010/0052082 | A1 | 3/2010 | Lee et al. |
| 2012/0322055 | A1* | 12/2012 | Royyuru .......... G01N 33/48721 |
| | | | 435/6.1 |
| 2016/0097641 | A1 | 4/2016 | Dai et al. |

OTHER PUBLICATIONS

Agafonov et al. (VM Agafonov, DL Zaitsev, Convective noise in molecular electronic transducers of diffusion type, Technical Physics 55(1) (2010) 130-136). (Year: 2010).*
Kozlov et al. (VA Kozlov, VM Agafonov, J Bindler, AV Vishnyakov, Small, low-power, low-cost sensors for personal navigation and stabilization systems, Proceedings of the 2006 National Technical Meeting of the Institute of Navigation, Monterey, CA, Jan. 2006, pp. 650-655). (Year: 2006).*
Leugoud et al. (R Leugoud, A Kharlamov, Second generation of a rotational electrochemical seismometer using magnetohydrodynamic technology, J. Seismol 16 (2012) 587-593). (Year: 2012).*
Polysulfone ((2014) PES (Poly(ether sulfone)), Polysulfone. In: Kobayashi S., Mullen K. (eds) Encyclopedia of Polymeric Nanomaterials. Springer, Berlin, Heidelberg; DOI: 10.1007/978-3-642-36199-9) (Year: 2014).*
Anderson, D. L., et al. (1977) Seismology on Mars, J. Geophys. Res., 82, 4524-4546.
Bland, M. T., et al. (2012) Enceladus' extreme heat flux as revealed by its relaxed craters, Geophys. Res. Lett., 39, L17204, 5 pages.
Borra, E. F., et al. (2007) Deposition of metal films on an ionic liquid as a basis for a lunar telescope, Nature, 447, 979-981.
Bulow, R. C., et al. (2007) Temporal and spatial properties of some deep moonquake clusters, J. Geophys. Res., 112, E09003, 12 pages.
Hedman, M. M., et al. (2013) An observed correlation between plume activity and tidal stresses on Enceladus, Nature, 500, 182-184.
Huang, H., et al. (2013) A micro seismometer based on molecular electronic transducer technology for planetary exploration, Applied Physics Letters, 102, 193512-1 thru 193512-4.
Huang, H., et al. (2013) Molecular electric transducers as motion sensors: A Review, Sensors, 13, 4, 4581-4597.
Kahn, A., et al. (2005) Further constraints on the deep lunar interior, Geophys. Res. Lett., 32, L22203, 4 pages.
Kimura, J., et al. (2009) Size and compositional constraints of Ganymede's metallic core for driving an active dynamo, Icarus, 202, 216-224.

Kivelson, M. G., et al. (1996) Discovery of Ganymede's magnetic field by the Galileo spacecraft, Nature, 384, 537-541.
Kivelson, M. G., et al. (2002) The permanent and inductive magnetic moments of Ganymede, Icarus, 157, 507-522.
Kovach, R. L., et al. (1973) Apollo 17 seismic profiling: Probing the lunar crust, Science, 180, 1063-1064.
Latham, G., et al. (1970) Seismic data from man-made impacts on the Moon, Science, 170, 620-626.
Lognonne, P. (2005) Planetary seismology, Annu. Rev. Earth Planet. Sci., 33, 571-604.
Nakamura, Y., et al. (1974) Deep lunar interior inferred from recent seismic data, Geophys. Res. Lett., 1, 137-140.
Nakamura, Y., et al. (1979) Martian wind activity detected by a seismometer at the Viking lander 2 site, Geophys. Res. Lett., 6, 499-502.
Patthoff, D., et al. (2011) A fracture history on Enceladus provides evidence fora global ocean, Geophys. Res. Lett., 38, L18201, 6 pages.
Rost, S., et al. (2002) Array seismology: Methods and applications, Rev. Geophys., 40, pp. 2-1-2-27.
Rost, S., et al. (2009) Improving seismic resolution through array processing techniques, Surv. Geophys., 30, 271-299.
Schubert, G., et al. (2004) Interior composition, structure and dynamics of the Galilean Satellites, In "Jupiter: The Planet, Satellites and Magnetosphere", Bagenal, Dowling and McKinnon, eds., Cambridge Univ. Press, p. 281-306.
Smrekar, S., et al. (1999) Deep Space 2: The Mars microprobe mission, J. Geophys. Res., 104, 27013-27030.
Tang, R., et al. (2013) Three dimensional flexible Thermal sensor for intravascular flow monitoring, IEEE Sensors Journal, 13, 3991-3998.
Toksoz, M. N., et al. (1972) Lunar crust: Structure and composition, Science, 176, 1012-1016.
Travis, B. J., et al. (2012) A whole-moon thermal history model of Europa: Impact of hydrothermal circulation and salt transport, Icarus, 218, 1006-1019.
Weber, R. C., et al. (2011) Seismic detection of the lunar core, Science, 331, 309-312.
Yu, H. et al. (2008) Flexible Polymer Sensors for In Vivo Intravascular Shear Stress Analysis, Journal of Microelectromechanical Systems, 17, 1178-1186.
Zhan, X., et al. (2012) Powering Ganymede's dynamo, J. Geophys. Res., 117, E08011, 7 pages.
Kozlov, V. A., et al. (2003) Self-noise of molecular electronic transducers, Technical Physics, 48, 1579-1582.
Agafonov, V. M., et al. (2010) Convective noise in molecular electronic transducers of diffusion type, Technical Physics, 55, 130-136.
Huang, H., et al. (2013) Molecular Electronic Transducer-Based Low-Frequency Accelerometer Fabricated With Post-CMOS Compatible Process Using Droplet as Sensing Body, IEEE Electron Device Letters, 34, 1304-1306.
Krishtop, V. G., et al. (2012) Technological principles of motion parameter transducers based on mass and charge transport in electrochemical microsystems, Russian Journal of Electrochemistry, 48, 746-755.
Armand, M., et al. (2009) Ionic-liquid Materials for the Electrochemical Challenges of the Future, Natural Materials, 8, 621-629.
Bulow, R., et al. (2008) A seismometer at the lunar south pole, 39th Lunar and Planetary Science Conference, 2 pages.
Celler, G. K., et al. (2003) Frontiers of silicon-on-insulator, Journal of Applied Physics, 93, 4995-4978.
Dunnebier, F. K., et al. (1974) Thermal moonquakes, Journal of Geophysical Research, 79, 4351-4364.
Ingate, S., et al. (2004) Prospects for Low-Frequency Seismometry—a report of the IRIS broadband seismometer workshop, Granlibakken, California, Mar. 24-26, 2004, 32 pages.
Griggs, C. E., et al. (2007) Seismometer for strange quark nugget search and for lunar science studies, Nuclear Physics B (Proc. Suppl.), 166, 209-213.
Hollis, J. M., et al. (2002) Interstellar Antifreeze: Ethylene Glycol, The Astrophysical Journal, 571, L59-L62.

(56) References Cited

OTHER PUBLICATIONS

Lammlein, D. R. (1977) Lunar seismicity and tectonics, Physics of the Earth and Planetary Interiors 14, 224-273.
Lemke, D. (2009) The Short History of Infrared Space Telescopes, Astron. Nachr., 6, 562-567.
Lognonne, P., et al. (2000) The NetLander very broadband seismometer, Planetary and Space Science, 48, 1289-1302.
Frohlich, C., et al. (2006) Possible extra-solar-system cause for certain lunar seismic events, Icarus, 185, 21-28.
Neal, C. R., et al. (2003) A future moon mission: The lunar seismic network, 34th Lunar and Planetary Science Conference, 2 pages.
Neal, C. R. (2008) Future lunar science opportunities—What's left to be done?, 39th Lunar and Planetary Science Conference, 2 pages.
Oberst J., et al. (1991) A search for clustering among the meteoroid impacts detected by the Apollo lunar seismic network, Icarus, 91, 315-325.
Pike, W. T., et al. (2005) A high-sensitivity broad-band seismic sensor for shallow seismic sounding of the lunar regolith, 36th Lunar and Planetary Science Conference, 2 pages.
Torimoto, T., et al. (2010) New Frontiers in Materials Science Opened by Ionic Liquids, Advanced Materials, 22, 1196-1221.
Yamada, R. et al. (2009) Capability of the penetrator seismometer system for lunar seismic event observation, Planetary and Space Science, 57, 751-763.
Huang, H., et al. (2013) An Electrolyte Droplet-Based Low Frequency Accelerometer Based on Molecular Electronic Transducer. In Proceedings of the 17th International Solid-State Sensors, Actuators and Microsystems Conference and Transducers 2013, Barcelona, Spain, pp. 924-927.
Partridge, A., et al. (2000) A high-performance planar piezoresistive accelerometer, Journal of Microelectromechanical Systems 9(1):58-66.
Roylance, L. M., et al. (1979) A batch-fabricated silicon accelerometer, IEEE Transactions on Electron Devices, 26(12):1911-1917.
Krishnamoorthy, U., et al. (2008) In-plane MEMS-based nano-g accelerometer with sub-wavelength optical resonant sensor. Sensors and Actuators A: Physical, 145-146:283-290.
Liang, M. (2013) A Molecular Electronic Transducer based Low-Frequency Accelerometer with Electrolyte Droplet Sensing Body, Master's Thesis at Arizona State University, 41 pages.
The International Search Report and Written Opinion dated Mar. 5, 2015 for International Application No. PCT/US2014/066504.

\* cited by examiner

MICROFABRICATION TECHNOLOGY FOR PRODUCING SENSING CELLS FOR MOLECULAR ELECTRONIC TRANSDUCER BASED SEISMOMETER

CROSS-REFERENCE TO RELATED APPLICATIONS

This application represents the U.S. National Stage of International Application No. PCT/US2014/066504, filed Nov. 20, 2014 which is based on, claims priority to, and incorporates herein by reference in its entirety U.S. Provisional Application Ser. No. 61/906,459, filed Nov. 20, 2013.

STATEMENT REGARDING FEDERALLY SPONSORED RESEARCH

This invention was made with government support under NNX10AL25G awarded by National Aeronautics and Space Administration. The government has certain rights in the invention.

FIELD OF THE INVENTION

The invention relates to microfabrication technology for producing sensing cells. More particularly, the invention relates to microfabrication technology for producing sensing cells, such as those used in molecular electronic transducer-based seismometers.

BACKGROUND OF THE INVENTION

Motion sensors, including accelerometers and gyroscopes, provide measurement of movement in at least six degrees of freedom. The simplest way to do motion sensing is with a solid-state mass-spring system, creating a damped simple harmonic oscillator. The movement of the solid-state proof mass can be measured with respect to displacement, velocity, or acceleration by suitable mechanical-electrical transducers. Efforts to miniaturize linear accelerometers and gyroscopes for inertial systems are mostly concentrated around Micro-Electro-Mechanical Systems (MEMS) technology. Similarly, in terms of design, fabrication, and readout, accelerometers and gyroscopes are the current leaders in commercially successful MEMS technology. Among a variety of transduction mechanisms underlying solid-state MEMS motion sensors, the most successful types are based on capacitive transduction due to the simplicity of the sensor element itself, no need for exotic materials, low power consumption, and good stability with respect to temperature. Although capacitive transducers have a characteristic non-linear capacitance vs. displacement response, feedback is commonly used to convert the signal to a linear output. MEMS motion sensors in combination with other sensors, such as compass, pressure sensor, and GPS, have created a consumer electronics sensing package that works as the intelligent interface for users to interact with their electronics and, further on, with external environments, and have reasonable performance with low cost CMOS-compatible silicon microfabrication technology. However, in addition to high-volume consumer electronics markets requiring low-to-medium performance motion sensors, there are huge markets for high-performance motion sensing devices, with applications designed for military inertial navigation/guidance, high-resolution seismic sensing, and high-g sensors. The key requirements for these high-performance applications include small size, wide bandwidth, low noise floor, low cross-axis sensitivity, low drift, wide dynamic range, high shock survivability, and low power consumption. There has been plenty of work done along the direction of scaling down the device size while maintaining low noise, high sensitivity and high resolution using MEMS techniques. However, the design and fabrication of these solid-state MEMS devices are complicated, which can result in low reliability, low reproducibility, and high cost. More importantly, they have yet to prove satisfactory for specific applications, especially in low frequency seismic sensing, because of the inherent limitation of the working mechanism of the solid-state mass-spring system. For some applications they also have limited successes due to their fragility to high shocks.

In contrast to a device having a solid inertial mass, a molecular electronic transducer (MET) utilizes a liquid electrolyte relative to fixed electrodes to sensitively measure movement. METs are part of a third class of fundamental electronic devices, characterized by charge transfer via ions in solution—hence the name—Solion. This is in contrast to solid-state electronics (charge transfer by electron/hole pairs in a solid conductor or semiconductor) and vacuum tubes (charge transfer by free electrons in an ionized gas or vacuum). Solion technology was first developed in the 1950s by US-Navy sponsored research. Early applications of Solion devices were for detection of low-frequency acoustic waves, either in the form of an infrasonic microphone or limited-band seismometer. Significant work on Solion motion detectors was continued in Russia, where the term Molecular Electronic Transducer (MET) was introduced to describe such a device. Inspired by the exceptionally high rate of mechanical signal conversion to electric current in MET involving mass and charge transport, pioneering MET studies provide an alternative paradigm in the development of motion sensors in wide variety of applications including nuclear explosion monitoring and seismic sensing in planetary exploration. The advantages of MET motion sensors include their small size, lack of fragile moving parts (thus high shock tolerance), high sensitivity and low noise especially at low frequencies, and independence of the response on installation angle. However, despite the rather high output parameters obtained, conventional MET devices developed and produced at present have a number of disadvantages that ultimately limit their application range. Some disadvantages include high cost of transducer manufacturing and instrument self-noise.

What is needed, therefore, is a technology capable of producing effective sensing cells at reduced cost and minimized self-noise.

SUMMARY OF THE INVENTION

The present invention overcomes aforementioned drawbacks of previous technologies by providing an approach for producing sensing cells applicable to micro electric transducer based seismometers, geophones, and accelerometers, and so on. In some aspects of the disclosure, novel microfabrication processes are introduced, which afford many advantages, including producing sensing cells at low cost, with high yield and reproducibility, as well as a wide range adjustability. In some embodiments, microfabrication processes described herein can produce miniaturized robust seismometers with high performance.

In one aspect of the present disclosure, a method for fabricating a sensing element is provided. The method includes providing a first wafer including a first substrate, a second substrate, and a first insulating layer between the first substrate and the second substrate, and etching a first fluid throughhole through the first substrate, the first insulating layer, and the second substrate. The method also includes coating the first substrate with a first conductive coating from top and the second substrate with a second conductive coating from back, and providing a second wafer including a third substrate, a fourth substrate, and a second insulating layer between the third substrate and the fourth substrate. The method further includes etching a second fluid throughhole through the third substrate, the second insulating layer, and the fourth substrate, and coating the third substrate with a third conductive coating from top and the fourth substrate with a fourth conductive coating from back.

In another aspects of the present disclosure, a method for fabricating a sensing element is provided. The method includes providing a first wafer including a first substrate, a second substrate, a third substrate, a first insulating layer between the first substrate and the second substrate, and a second insulating layer between the second substrate and the third substrate, etching a first fluid throughhole through the first substrate, the first insulating layer, the second substrate, the second insulating layer, and the third substrate, and coating the first substrate with a first conductive coating from top, the second substrate and the third substrate with a second conductive coating from back. The method also includes providing a second wafer including a fourth substrate, a fifth substrate, a sixth substrate, a third insulating layer between the fourth substrate and the fifth substrate, and a fourth insulating layer between the fifth substrate and the sixth substrate, and etching a second fluid throughhole through the fourth substrate, the third insulating layer, the fifth substrate, the fourth insulating layer, and the sixth substrate. The method further includes coating the fourth substrate with a third conductive coating from top, the fifth substrate and the sixth substrate with a fourth conductive coating from back.

In yet another aspect of the present disclosure, a sensing element is provided. The sensing element includes a housing defining a channel, a first electrochemical cell including a first anode, a first cathode, and a first dielectric spacer between the first anode and the first cathode, the first electrochemical cell being located in the channel, and a second electrochemical cell including a second anode, a second cathode, and a second dielectric spacer between the second anode and the second cathode, the second electrochemical cell being located in the channel. The sensing element also includes a fluid throughhole extending through the first electrochemical cell and the second electrochemical cell, and an electrolyte in the channel. The sensing element further includes a circuit generating an output signal based on a comparison of cathode currents in the first electrochemical cell and the second electrochemical cell, wherein the first dielectric spacer is dimensioned to create a recess at an inner surface of the fluid throughhole between the first anode and the first cathode.

The foregoing and other advantages of the invention will appear from the following description. In the description, reference is made to accompanying drawings which form a part thereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

Like reference numerals will be used to refer to like parts from Figure to Figure in the following detailed description.

DETAILED DESCRIPTION OF THE INVENTION

The present disclosure introduces novel microfabrication processes for producing sensing elements that have a wide range of applicability and afford many advantages over previous technologies. In some aspects, methods of the present disclosure may be utilized to produce molecular electronic transducer (MET) sensors or devices for use in detecting motion with high sensitivity for use, for example, in applications including seismometers, accelerometers, gyroscopes, and so on. In particular, advantages of MET sensors, as compared to other inertial sensors include, but are not limited to: (1) the inertial mass of the liquid therein (i.e. an electrolyte solution) and lack of moving mechanics, which are subject to wear out and possible damage, enhances performance, reliability and enables the inherent ability to withstand high shock forces. (2) High sensitivity and low self-noise can be achieved at low and ultra-low frequency ranges, or even DC with the liquid inertial mass, with properly selected parameters and structural design. (3) Sensitivity does not depend on the orientation in space.

In general, the sensing mechanism of a MET device can include multiple electrochemical cells, where reversible chemical reactions transfer charge between respective anodes and cathodes via electrolyte ions in solution therein. Typically, a MET sensor uses a concentrated iodine-iodide electrolyte containing potassium iodide (KI) or lithium iodide (LiI) and a small amount of elemental Iodine ($I_2$). In the presence of iodide, iodine turns into a soluble compound, tri-iodide, as follows $$I_2 + I^- \rightarrow I_3^- \qquad (1)$$

When the electrodes are biased, measurable electrical current passes through the electrochemical cell, and reversible active electrochemical reactions occur on the electrodes. Specifically, on the cathodes, a reduction reaction of tri-iodide occurs as follows:

$$I_3^- + 2e^- \rightarrow I_3^- \qquad (2)$$

while the reverse reaction takes place on the anodes, namely:

$$3I^- - 2e^- \rightarrow I_3^- \qquad (3)$$

The electrical current through the solid/liquid interface becomes possible because of the presence of tri-iodide ions in the solution, also termed the active component of the solution. According to Equation (2), the interface charge transfer is associated with generation and absorption of the tri-iodide ions on the electrode surface. Thus, the electrical current through any electrode can be related to the flux of active ions toward or backward of the electrode according to the following:

$$I = Dq \left( \oint_S (\nabla c, n) dS \right) \quad (4)$$

where D is the diffusion coefficient, c is the concentration of the active charge carriers, q is the charge transferred across the interface in single electrochemical reaction (two times absolute values of the electron charge in our case), n is a unit vector normal to the surface of the electrode, integration is done over S, electrode surface area. In Eqn. 4 only diffusion is considered as the mechanism responsible for the active ions transport in the electrolyte volume. Migration is not included due to the screening of the electrical field in the highly concentrated electrolyte, while convection does not contribute to charge transfer through the electrode surface due to zero-velocity condition on the solid surface.

Figure 1A:
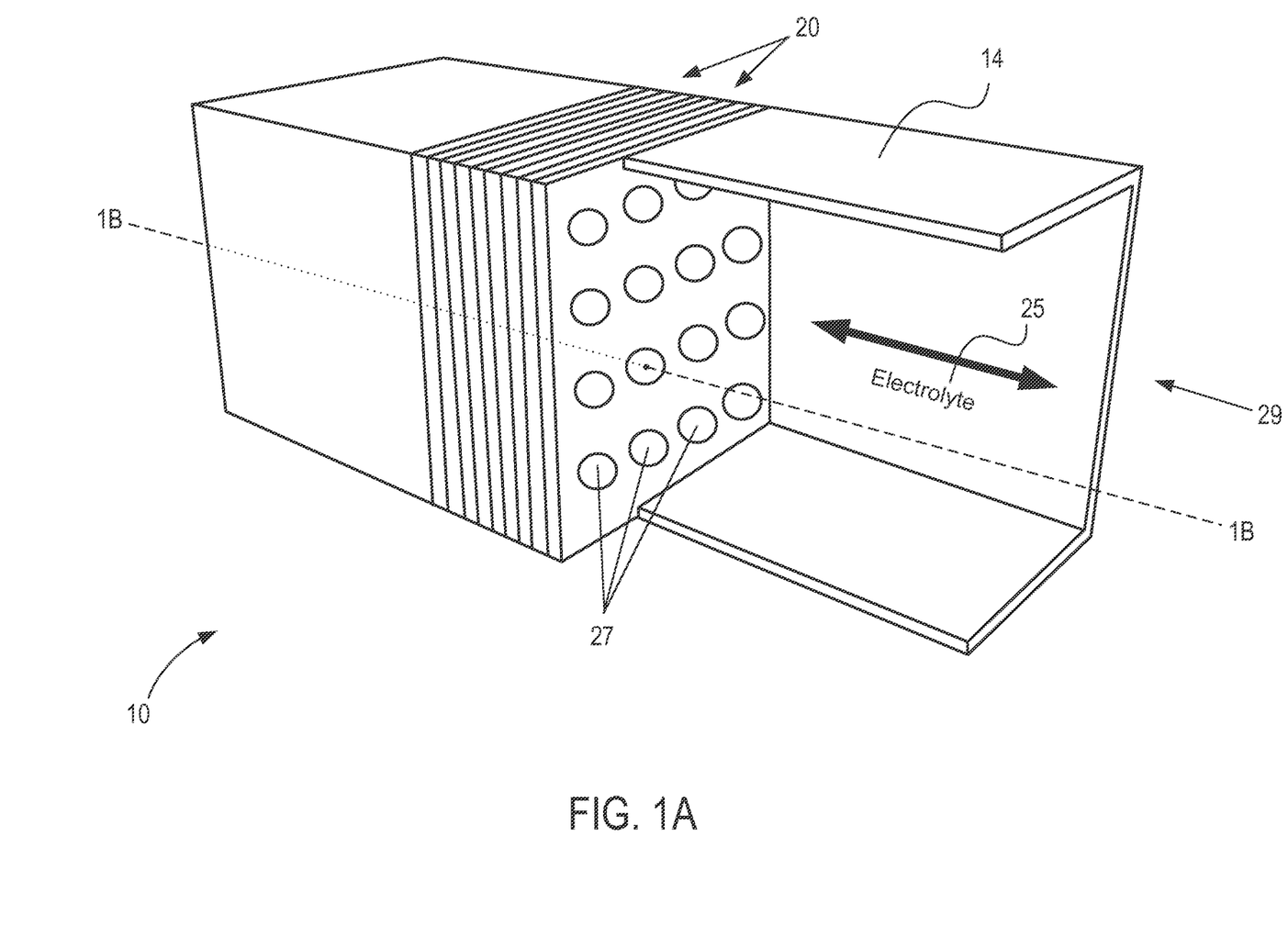
FIG. 1A shows a schematic of an illustrative MET sensing element.
Figure 1B:
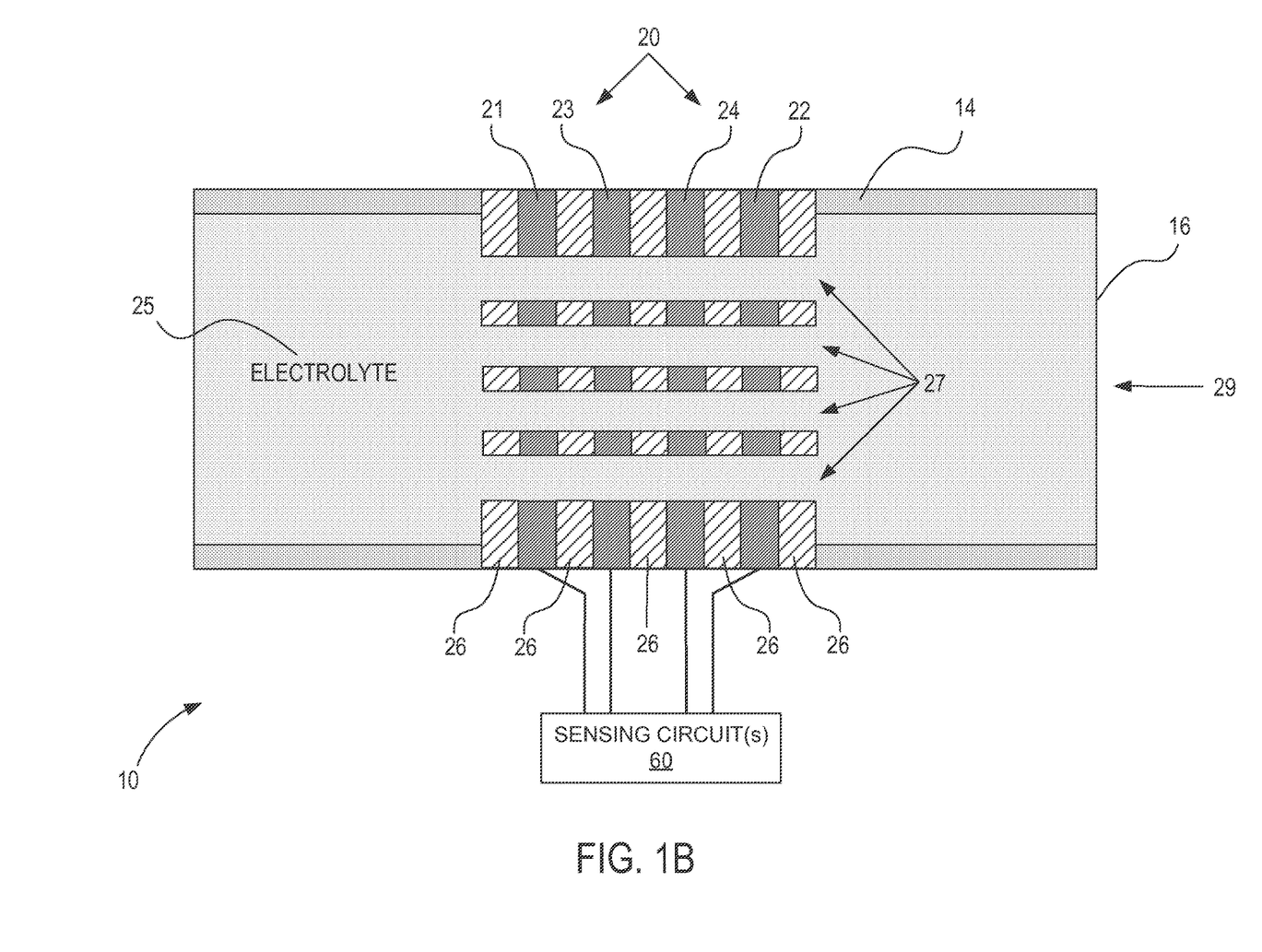
FIG. 1B is a cross-sectional view of the MET sensing element of FIG. 1A taken along a plane parallel to line 1B-1B of FIG. 1.

Referring now to FIGS. 1A and 1B, an illustrative MET sensing element 10, in accordance with aspects of the present disclosure, is shown. Specifically, sensing element 10 includes a housing 14, opposed rubber end membranes 16, electrochemical cells 20 that include a number of anode-cathode pairs. Sensing element 10 also includes an electrolyte-filled channel 29 that allows an electrolyte 25 solution to move inertially along the length of the channel 29. Sensing element 10 also includes sensing circuit(s) 60, including appropriate hardware and circuitry, and configured to provide a bias to electrodes of sensing element 10 and detect electrical currents therefrom, as described.

The sensing cells 20, as illustrated in FIG. 1B, include four electrodes (first anode 21, second anode 22, first cathode 23, second cathode 24) separated by dielectric layers 26 spanning the cross-sectional width of this channel 29. Throughholes 27 through the electrodes allow the flow of the electrolyte 25. In addition, each anode-cathode pair in the electrochemical cells 20 may be configured to allow charge transfer via ions in the electrolyte 25, thus generating an electric current measurable using the sensing circuit(s) 60. As shown in FIG. 1B, the electrodes may be configured in an anode-cathode-cathode-anode (ACCA) configuration, although it may be appreciated that other configurations of cathodes and anodes may also be possible.

The operation principle of the MET sensing element 10 can be described as follows. Specifically, when an electric bias voltage is applied between electrodes of the electrochemical cells 20, electrochemical current is generated facilitated via the electrolyte 25. In particular, a current is generated regardless of the presence of mechanical motion of the electrolyte, also known as the background current. As the inter-electrode voltage is increased, the reaction rates occurring at the electrodes increase. In the situation when any tri-iodide ion arrives at a cathode, it immediately participates in the electrochemical reaction described Equation (2), and further increase in the voltage does not change the current and the saturation regime occurs. In this regime the cathode current is sensitive to variation of volumetric transport of tri-iodide ions. Anode current variations follow cathode current variations, keeping the electrolyte 25 uncharged.

In the presence of mechanical motion, the electrolyte 25 in the sensing element 10 undergoes motion due to inertia, and convective transport of ions modifies electrode currents according to mechanisms described above. Although each electrode current may be non-linear with respect to the velocity of the electrolyte 25, the combined output of both cathodes is linear for a very wide range of velocities. Specifically, the difference between the cathode currents in two anode-cathode pairs is linear, and may then employed as the output signal for the sensing element 10 to provide an indication of motion. Mathematically, the sensor's output current may be given by:

$$I_{out} = I_{C2} - I_{C1} = Dq \left( \oint_{S_{C2}} (\nabla c, n) dS_{C2} - \oint_{S_{C1}} (\nabla c, n) dS_{C1} \right) \quad (5)$$

where, $I_{C1}$, $I_{C2}$ are the currents through the surface of the corresponding cathodes, and $S_{C1}$, $S_{C2}$ are the surface areas of the corresponding cathodes.

Traditionally, electrodes in electrochemical cells 20 may be produced using machined conductive meshes, separated by dielectric spacers, such as plastic or ceramic grid spacers. This design, although convenient in that sensors may be assembled quickly, has significant limitations on the possible range of the geometrical parameters of an electrochemical cell, and consequently the optimization possibilities of the cell. For instance, in some applications, reduced cell dimensions are necessary in order to expand the frequency range of the sensor and decrease convection produced noise. Such dimensions are not achievable using the above mesh implementation.

Therefore, in accordance with aspects the present disclosure, an alternative methodology is provided to produce sensing elements, as described with reference to FIGS. 1A and 1B. Such approach can provide sensing elements with reduced internal dimensions, for example in the micrometer range, with improved the sensitivity and reproducibility. Specifically, electrochemical cells 20 of the sensing element 10 described with reference to FIGS. 1A and 1B can be produced in accordance with the fabrication process described in FIGS. 2A to 2G, or in accordance to the fabrication process described in FIGS. 3A to 3L.

Figure 2:
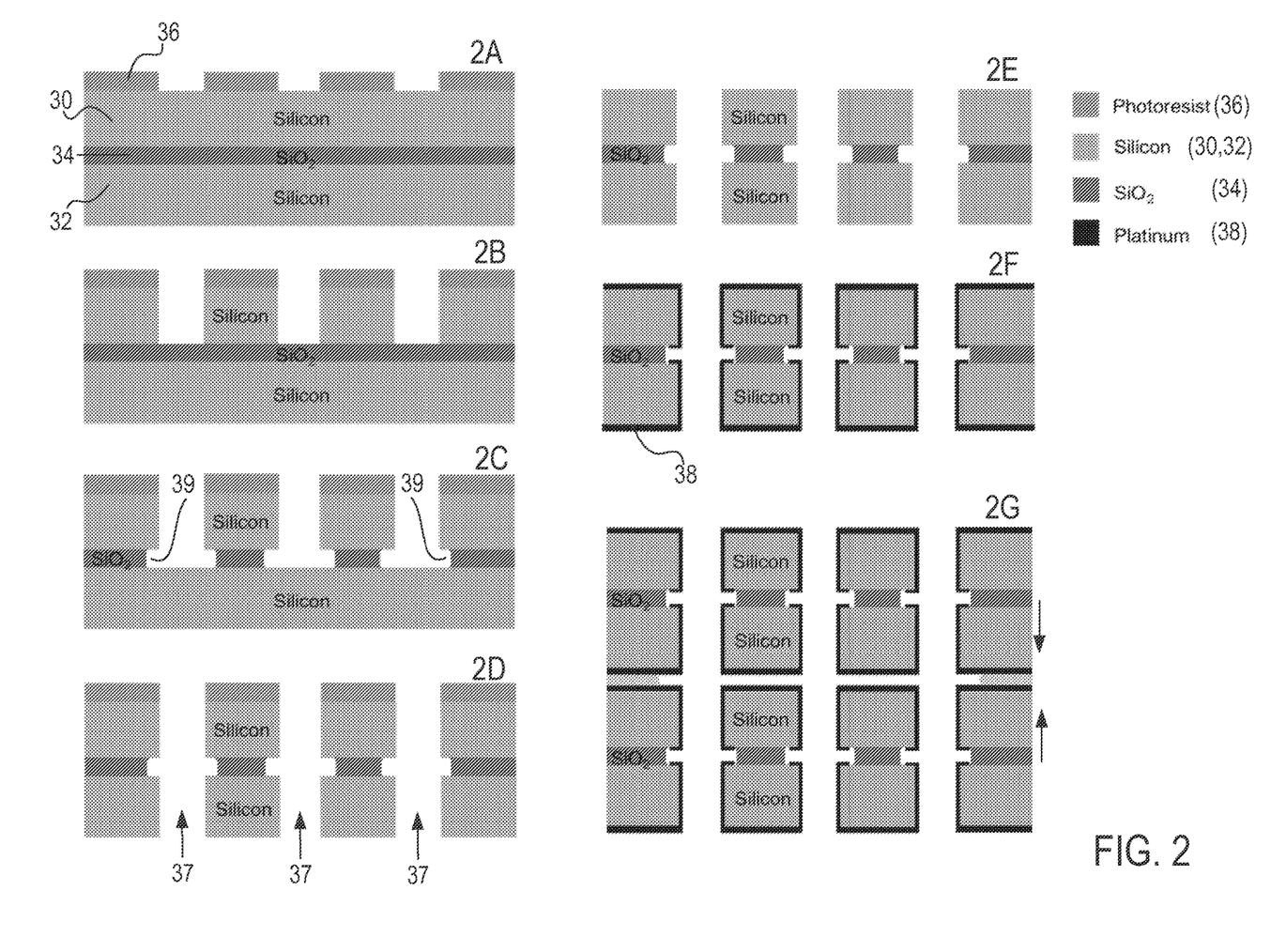
FIGS. 2A to 2G are cross-sectional views depicting steps in a microfabrication process, in accordance with aspects of the disclosure.

Referring now to FIG. 2, an example microfabrication process is shown in accordance with one aspect of the disclosure. Specifically, the process may begin with a single SOI (Silicon on Insulator) wafer, although it may be appreciated by a skilled artisan that other wafer types may also be utilized. In some aspects, the wafer can include a first substrate 30 and a second substrate 32, or device layers, separated by an insulating, or box, layer 34. The first substrate 30 and second substrate 32 can include silicon, while the insulating layer 34 can include silicon dioxide ($SiO_2$), although other materials and compositions may also be possible. By way of example, the first substrate 30 and second substrate 32 can have a thickness greater than 100 µm, while the insulating layer 34 can have a thickness between 3 and 5 µm, although other thicknesses may be possible.

As shown in the step of FIG. 2A, a photoresist layer 36 may be deposited and patterned on the first substrate 30, using photolithography techniques, wherein the photoresist layer 36 is used as an etching mask for a deep reactive ion etch (DRIE) process. Specifically, a DRIE may be performed to etch the first substrate 30 until the insulating later 34 is reached, as shown in FIG. 2B. Then the remaining photoresist layer 36 along with the first substrate 30 may then act as a mask for wet etching process of the insulating layer 34. As shown in FIG. 2C, an undercut 39, or recess, may be formed in the insulating later 34 by control of the wet etching process parameters. Such undercut 39 is desirable for the subsequent isolation between electrodes.

The second substrate 32 may then etched via a second DRIE process, opening up a set of fluid throughholes 37, as indicated in FIG. 2D. Following removal of the photoresist layer 36 in FIG. 2E, a coating process is performed, indicated in FIG. 2F, whereby the first substrate 30 is coated with conductive layer 38 from the top and the second substrate 32 is coated from the bottom of the wafer, forming a number of conductive electrodes. In some aspects, the conductive layer can include platinum, although it may be appreciated that other conductive materials may also be used. The coating process may include an electron-beam deposition, whereby the top and bottom surfaces of the first substrate 30 and second substrate 32, respectively, as well as the sidewalls forming the throughholes 37 are covered with the conductive layer. By controlling the angle between the metal source in the electron-beam deposition system and wafer surfaces, as well as the depth of the undercut 39, a short-circuiting of the top and bottom electrodes can be avoided.

As indicated in FIG. 2G, two of the above fabricated wafers can be aligned and adhesively bonded to form a sensing element with four isolated electrodes, in accordance with aspects of the present disclosure. For example, the wafers can be bonded using a Parylene-C adhesive layer. The above-described microfabrication method allows significant increase in the strength of supporting structure and the number of throughholes 37 compared with previous technologies. In addition, it does not include a focused ion beam processing step, thus greatly reducing the fabrication cost.

Figure 3:
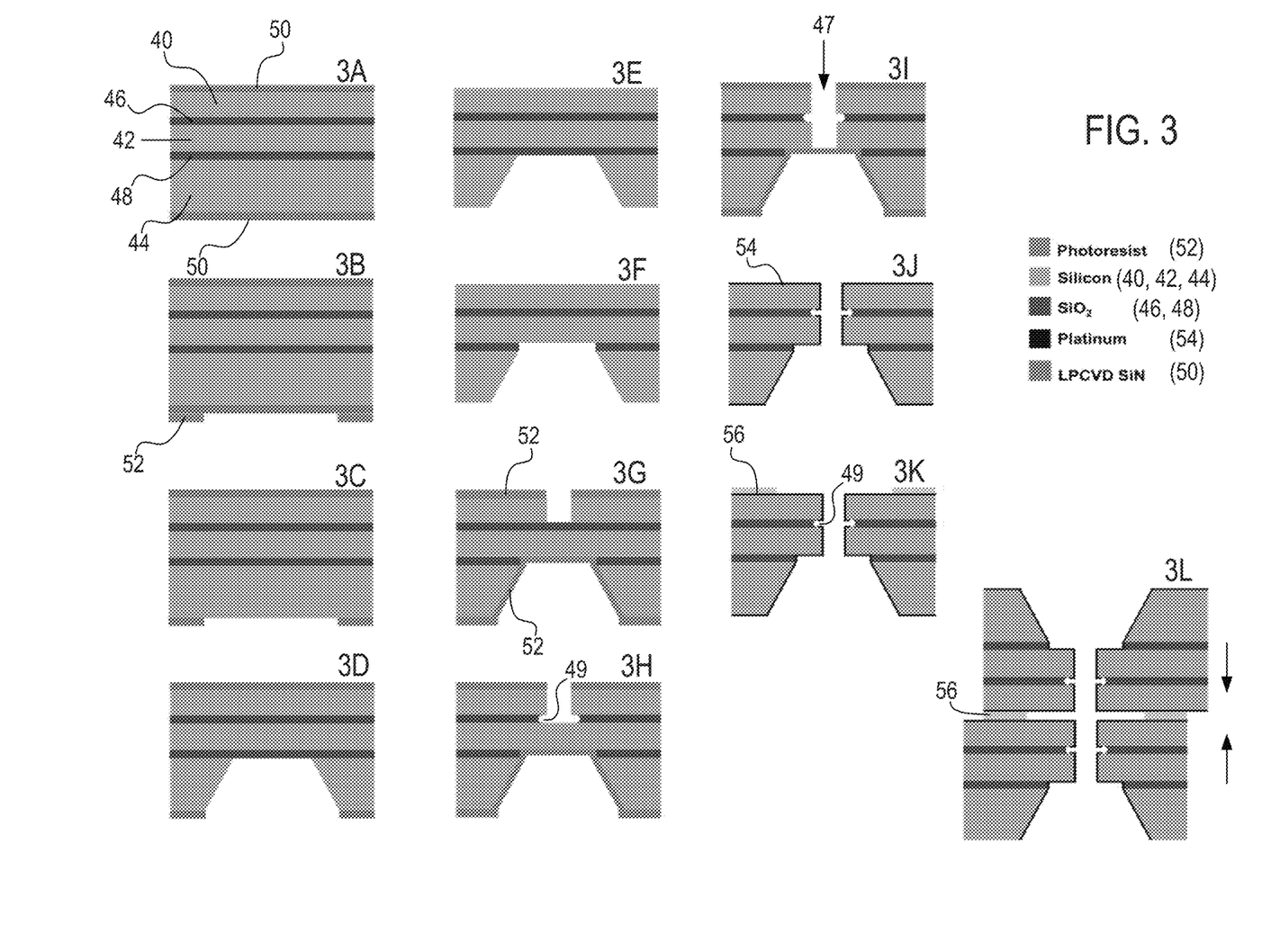
FIG. 3A to 3L are cross-sectional views depicting steps in another microfabrication process, in accordance with aspects of the disclosure.

Referring now to FIG. 3, another example microfabrication process is shown in accordance with another aspect of the disclosure. Specifically, the process may begin with a double-SOI (Silicon on Insulator) wafer, although it may be appreciated by a skilled artisan that other wafer types may also be utilized. The wafer includes a first substrate 40, a second substrate 42, a third substrate 44, along with a first insulating layer 46 between the first substrate 40 and the second substrate 44, and a second insulating layer 48 between the second substrate 42 and the third substrate 44. In particular, a double-SOI wafer, in accordance with some aspects of the present disclosure, provides a better symmetry for the configuration of anodes and cathodes.

The first substrate 40, second substrate 42, and third substrate 44 can include silicon, while the first insulating layer 46 and the second insulating layer 48 can include silicon dioxide ($SiO_2$), although other materials and compositions may also be possible. By way of example, the substrate layers can have thicknesses in the range of 1 to 10 µm, while the insulating layers can have thicknesses 1 to 3 µm, although other thicknesses may be possible.

The fabrication process may begin with the step of FIG. 3A, where a low pressure chemical vapor deposition (LVCVD) process may be utilized to deposit a device substrate layer 50 on both the top and bottom of the provided wafer. By way of example, the device substrate layer 50 can include a silicon nitride (SiN) layer. At the next step, shown in FIG. 3B, the backside, or bottom, of the wafer may be patterned using photolithography techniques, producing a patterned photoresist layer 52.

In the step of FIG. 3C, a reactive ion etching (RIE) process may be applied to the bottom of the wafer in order to etch the exposed device substrate layer 50. The patterned device substrate layer 50 would then act as a hard mask for a tetramethylammonium hydroxide (TMAH) etching process to remove the third substrate 44. As indicated by FIG. 3D, the etching process would be configured to stop at the second insulating layer 48, and provide a desirable sidewall profile in the third substrate 44.

In the step of FIG. 3E, the device substrate layer 50 may be then stripped, for example, using a hot phosphoric acid treatment, followed by a RIE to remove the second insulating layer 48, as indicated in FIG. 3F. In the step of FIG. 3G, a photoresist layer 52 is deposited onto the etched structure of the bottom portion of the wafer, providing protection from subsequent etching processes. Then, a DRIE process, for removing portions of the first substrate 46 down to the first insulating layer 46 using the top patterned photoresist layer 52, may then performed, as indicated by FIG. 3G. At this step a DRIE process is desirable, instead of TMAH etching, in order to form vertical profiles in the first substrate 46.

At the step of FIG. 3H, a hydrofluoric acid isotropic etching of the first insulating layer 46 may then be performed, generating an undercut 49, or recess in the insulating layer 46, which is desired to isolate electrodes. As indicated by FIG. 3I, a DRIE process may be continued to etch the exposed second substrate 42 until a fluid throughhole 47 opening is etched.

At the step of FIG. 3J, a coating process is performed, whereby the first substrate 46 is coated with conductive layer 54 from the top, and the second substrate 42 and third substrate 44 are coated from the bottom of the wafer, forming a number of conductive electrodes, for example, using an electron-beam evaporation technique. In some aspects, the conductive layer can include platinum, although it may be appreciated that other conductive materials may also be used. As illustrated in FIG. 3J, the conductive layer would desirably cover the top and side portions first substrate 40, the bottom and side portions of the second substrate 42 and the bottom and side portions of the third substrate 44, without electrical shorting in the undercut 49 area.

At the step of FIG. 3K, an adhesive layer 56, such as Parylene-C, may be selectively deposited. Finally, two wafers, fabricated as described, may then be adhesively bonded with alignment to complete the device, in accordance with the aspects of the present disclosure, as indicated in FIG. 3L.

One version of a sensing element of the invention, using methods described, includes a housing defining a channel; a first electrochemical cell including a first anode, a first cathode, and a first dielectric spacer between the first anode and the first cathode, the first electrochemical cell being located in the channel; a second electrochemical cell including a second anode, a second cathode, and a second dielectric spacer between the second anode and the second cathode, the second electrochemical cell being located in the channel; a fluid throughhole extending through the first electrochemical cell and the second electrochemical cell; an electrolyte in the channel; and a circuit generating an output signal based on a comparison of cathode currents in the first electrochemical cell and the second electrochemical cell, wherein the first dielectric spacer is dimensioned to create a recess at an inner surface of the fluid throughhole between the first anode and the first cathode.

In the sensing element, the second dielectric spacer may be recessed in relation to the second anode and the second cathode at an inner surface of the fluid throughhole. In the sensing element, the circuit may include a first voltage source in electrical communication with the first anode and the first cathode, and the circuit may include a second voltage source in electrical communication with the second anode and the second cathode. The first dielectric spacer and the second dielectric spacer each may comprise silicon dioxide. The first anode, the first cathode, the second anode, and the second cathode each may comprise silicon with a platinum coating.

In the sensing element, the first anode may comprise a first platinum coating, the first cathode may comprise a second platinum coating, and the first platinum coating and the second platinum coating may extend into the recess. The fluid throughhole may have an inside diameter greater at opposed ends of the fluid throughhole. The first electrochemical cell and the second electrochemical cell are preferably attached by a polymeric layer. The housing may have a first end comprising an elastic membrane and an opposed second end comprising an elastic membrane. The electrolyte may comprise an iodine-iodide electrolyte.

Figure 4:
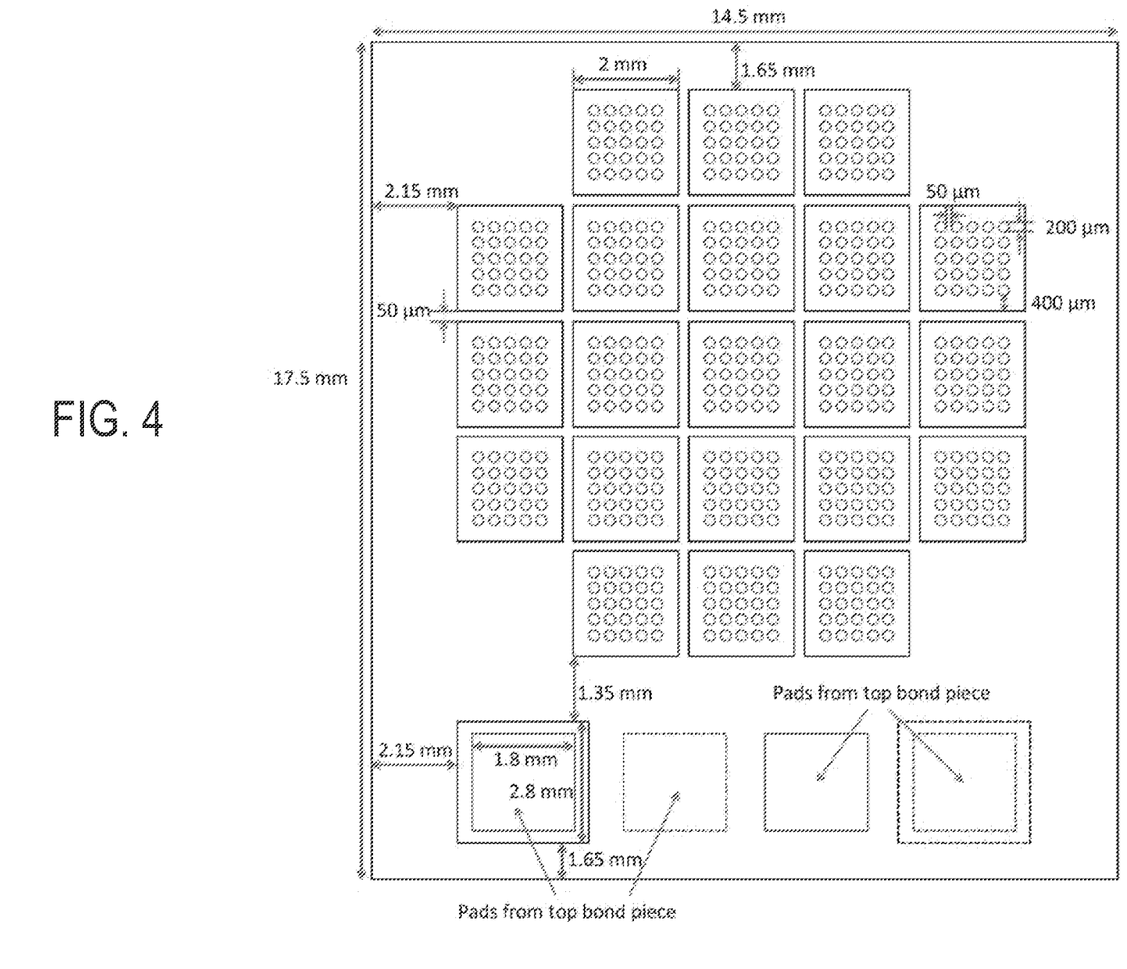
FIG. 4 is a top view of an illustrative MET-based device, in accordance with aspects of the present disclosure.

FIG. 4 shows an example device design with specific dimensional and number of sensor cell implementations. It may be appreciated that other dimensions and number of sensor cells may also be considered to be within the scope of the present disclosure. Specifically, the size of the device can be 17.5 millimeters by 14.5 millimeters and 1.1 millimeters thick. In one of the bonding pairs, configured for contacting sensing circuit(s), as described, the bottom KOH or TMAH patterns are 2 millimeter squares. The throughholes, as viewed from topside in FIG. 4, can have lateral diameters of 200 μm and spacing of 50 μm. For example, the number of throughholes in one square device can be 25. With a total of 21 devices, a total number of throughholes for the device is 525. In this case, the hydrodynamic resistance $R_h=1.16\times10^6$ (N·s)/m$^5$, which is 30,000 times lower than single-50 μm-diameter throughhole device. In addition, the self-noise is expected to be much lower. To adjust the hydrodynamic resistance, the diameter of holes can be varied from 50 μm to 400 μm, and the number of throughholes can be changed accordingly. The pads are at the bottom of the device for connections to external sensing circuitry.

Figure 5:
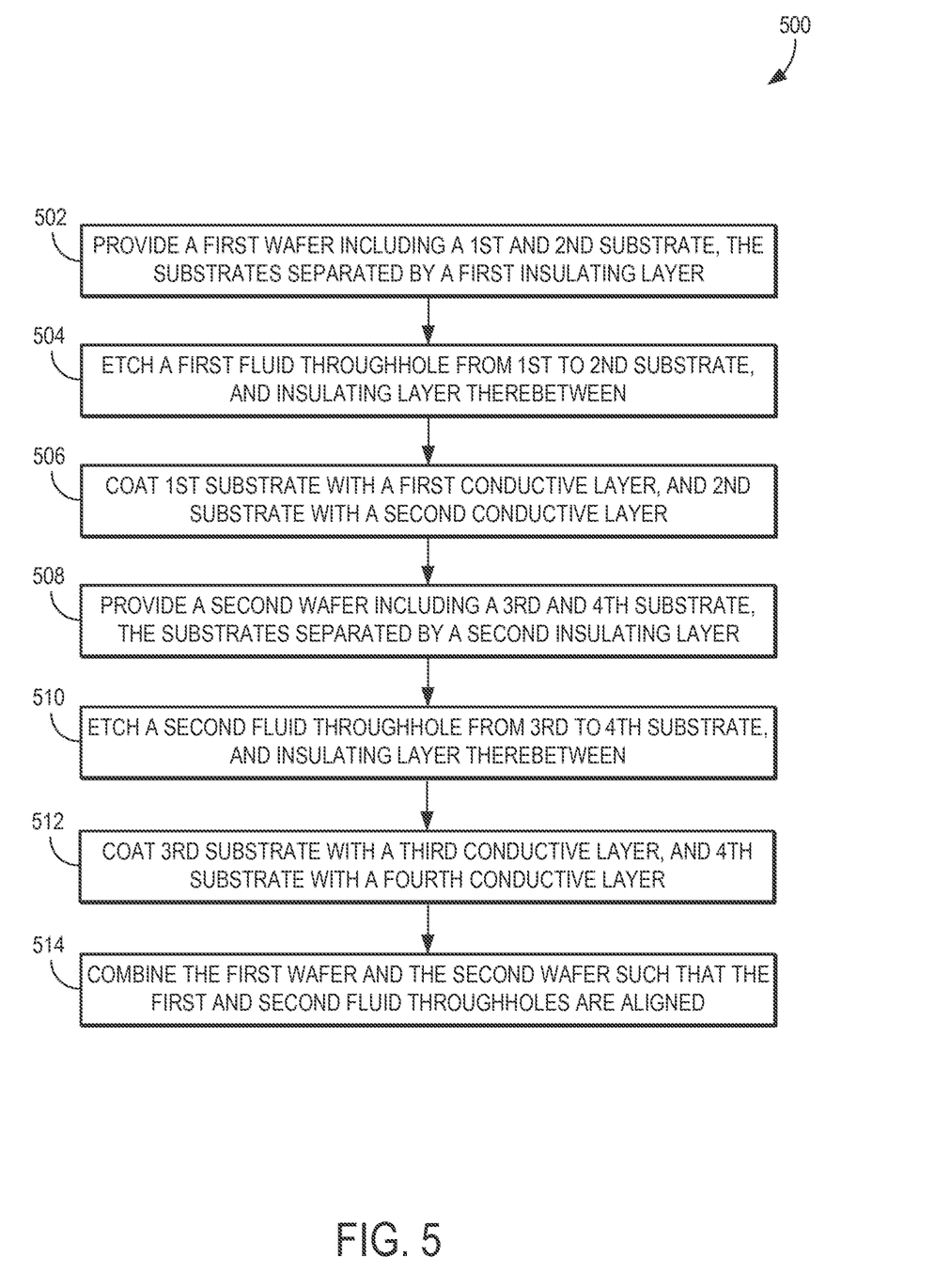
FIG. 5 are steps of an example process in accordance with aspects of the present disclosure.

Turning to FIG. 5, steps of process 500, in accordance with aspects of the present disclosure, as shown. Specifically, process 500 includes steps of (502) providing a first wafer including a first substrate, a second substrate, and a first insulating layer between the first substrate and the second substrate; (504) etching a first fluid throughhole through the first substrate, the first insulating layer, and the second substrate; (506) coating the first conductive coating on the first substrate and the second conductive coating from backside on the second substrate; (508) providing a second wafer including a third substrate, a fourth substrate, and a second insulating layer between the third substrate and the fourth substrate; (510) etching a second fluid throughhole through the third substrate, the second insulating layer, and the fourth substrate; and (512) coating the third conductive coating on the third substrate and the fourth conductive on the back of fourth substrate. Step (504) may comprise etching the first insulating layer to create a recess in the first fluid throughhole between the first substrate and the second substrate. Step (510) may comprise etching the second insulating layer to create a recess in the second fluid throughhole between the third substrate and the fourth substrate. The method may further comprise: (514) combining the first wafer and the second wafer together so the first fluid throughhole is aligned with the second fluid throughhole. In the method, the first insulating layer and the second insulating layer may comprise silicon dioxide, and the first, second, third and fourth conductive coating may comprise platinum.

Figure 6:
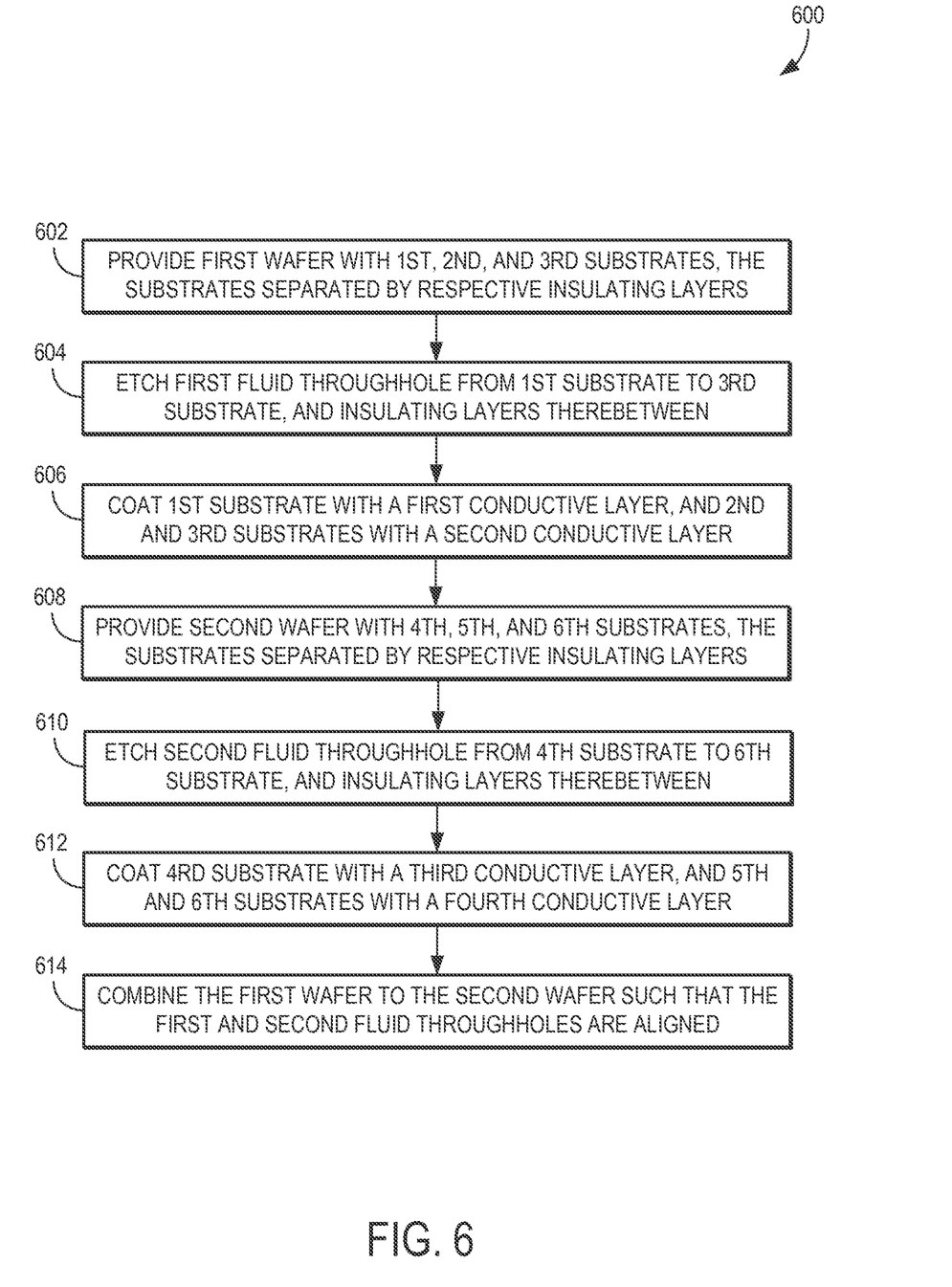
FIG. 6 are steps of another example process in accordance with aspects of the present disclosure.

Turning to FIG. 6, steps of another process 600, in accordance with aspects of the present disclosure, as shown. Specifically, process 600 includes steps of (602) providing a first wafer including a first substrate, a second substrate, a third substrate, a first insulating layer between the first substrate and the second substrate, and a second insulating layer between the second substrate and the third substrate; (604) etching a first fluid throughhole through the first substrate, the first insulating layer, the second substrate, the second insulating layer, and the third substrate; (606) coating the first substrate, the second substrate, and the third substrate with conductive coatings; (608) providing a second wafer including a fourth substrate, a fifth substrate, a sixth substrate, a third insulating layer between the fourth substrate and the fifth substrate, and a fourth insulating layer between the fifth substrate and the sixth substrate; (610) etching a second fluid throughhole through the fourth substrate, the third insulating layer, the fifth substrate, the fourth insulating layer, and the sixth substrate; and (612) coating the fourth substrate, the fifth substrate, and the sixth substrate with conductive coatings. Step (604) may comprise etching the first insulating layer to create a recess in the first fluid throughhole between the first substrate and the second substrate. Step (610) may comprise etching the third insulating layer to create a recess in the second fluid throughhole between the fourth substrate and the fifth substrate. The method may further comprise: (614) bonding the first wafer and the second wafer together so the first fluid throughhole is aligned with the second fluid throughhole. In the method, the first fluid throughhole may have a diameter at a first end greater than that of a diameter at an opposed second end.

In summary, the present disclosure introduces novel microfabrication processes for producing sensing elements that afford many advantages over previous technologies. For instance, in comparison with traditional seismometers, devices based on the provided sensing cells can deliver similar performance, but much lower cost, and higher dynamic range. For instance, devices based on above-described sensing cells can have wide application in geological and seismological science exploration, but may also will be useful for oil and gas detection in energy industry and motion monitoring in national security. In addition, the robustness, shock tolerance and independence on installation angle will increase the range of applicability and reduce the cost dramatically on field installation. By way of example, applications where prior technologies would be limited include installation in launching (penetrator) devices or systems.

Capabilities of the sensing elements, produced in accordance with the present disclosure, include significant increases in the strength of supporting structures and the number of throughholes in the electrochemical cells, resulting low hydraulic impedance. Therefore, the self-noise of the device is greatly reduced. 3D microfabrication technologies including photolithography, deep reactive ion etching (DRIE), rotated E-beam metal evaporation, and alignment bonding offer better control of the device size, sharp vertical channels, good isolation between electrodes, larger surface area of the electrodes, and well alignment of the throughholes. The enlarged surface area of the electrodes exposed in the electrolyte significantly increases the sensitivity of the device. The method of the invention uses silicon based microfabrication, which has much better precision, lower cost, and higher performance than traditional technology. Meanwhile, it does not have a focus ion beam process involved, thus greatly reducing the fabrication cost.

Although the present invention has been described in detail with reference to certain embodiments, one skilled in the art will appreciate that the present invention can be practiced by other than the described embodiments, which have been presented for purposes of illustration and not of limitation. Therefore, the scope of the invention should not be limited to the description of the embodiments contained herein.

What is claimed is:

1. A sensing element comprising:
a housing defining a channel;
a first electrochemical cell including a first anode, a first cathode, and a first dielectric spacer between the first anode and the first cathode, the first electrochemical cell being located in the channel;
a second electrochemical cell including a second anode, a second cathode, a second dielectric spacer between the second anode and the second cathode, and a third dielectric spacer, the second electrochemical cell being located in the channel;
a fluid throughhole extending through the first electrochemical cell and the second electrochemical cell, wherein a first diameter between a first portion of the first anode and a second portion of the first anode is at least as wide as a second diameter between a first portion of the third dielectric spacer and a second portion of the third dielectric spacer;
an electrolyte in the channel; and
a circuit generating an output signal based on a comparison of cathode currents in the first electrochemical cell and the second electrochemical cell,
wherein the first dielectric spacer is dimensioned to create a recess in the fluid throughhole between the first anode and the first cathode, and wherein a third diameter between a third portion of the first anode and a fourth portion of the first anode is greater than a fourth diameter between a first portion of the second cathode and a second portion of the second cathode.

2. The sensing element of claim 1 wherein:
the second dielectric spacer is recessed in relation to the second anode and the second cathode at the an inner surface of the fluid throughhole.

3. The sensing element of claim 1 wherein:
the circuit includes a first voltage source in electrical communication with the first anode and the first cathode, and
the circuit includes a second voltage source in electrical communication with the second anode and the second cathode.

4. The sensing element of claim 1 wherein:
the first dielectric spacer and the second dielectric spacer each comprise silicon dioxide.

5. The sensing element of claim 1 wherein:
the first anode, the first cathode, the second anode, and the second cathode each comprise silicon with a platinum coating.

6. The sensing element of claim 5 wherein:
the first anode comprises a first platinum coating, the first cathode comprises a second platinum coating, and the first platinum coating and the second platinum coating may or may not extend into the recess.

7. The sensing element of claim 5 wherein the platinum coating is formed using an electron-beam evaporation technique.

8. The sensing element of claim 1 wherein:
the first electrochemical cell and the second electrochemical cell are attached by an adhesion layer.

9. The sensing element of claim 8, wherein the adhesion layer comprises a polymeric layer.

10. The sensing element of claim 1 wherein:
the housing has a first end comprising an elastic membrane and an opposed second end comprising an elastic membrane.

11. The sensing element of claim 1 wherein:
the electrolyte comprises an iodine-iodide electrolyte.

12. A sensing element comprising:
a housing defining a channel;
a first electrochemical cell including a first anode, a first cathode, and a first dielectric spacer between the first anode and the first cathode, the first electrochemical cell being located in the channel;
a second electrochemical cell including a second anode, a second cathode, a second dielectric spacer between the second anode and the second cathode, and a third dielectric spacer, the second electrochemical cell being located in the channel;
a fluid throughhole extending through the first electrochemical cell and the second electrochemical cell, wherein a first diameter between a first portion of the first anode and a second portion of the first anode is at least as wide as a second diameter between a first portion of the third dielectric spacer and a second portion of the third dielectric spacer;
an electrolyte in the channel; and
a circuit generating an output signal based on a comparison of cathode currents in the first electrochemical cell and the second electrochemical cell,
wherein a third diameter between a first portion of the first dielectric spacer and a second portion of the first dielectric spacer is greater than a diameter of the throughhole.

13. The sensing element of claim 12, wherein a fourth diameter between a third portion of the first anode and a fourth portion of the first anode is greater than a fifth diameter between a first portion of the second cathode and a second portion of the second cathode.

14. The sensing element of claim 12 wherein:
the circuit includes a first voltage source in electrical communication with the first anode and the first cathode, and
the circuit includes a second voltage source in electrical communication with the second anode and the second cathode.

15. The sensing element of claim 12 wherein:
the first dielectric spacer and the second dielectric spacer each comprise silicon dioxide.

16. The sensing element of claim 12 wherein:
the first anode, the first cathode, the second anode, and the second cathode each comprise silicon with a platinum coating.

17. The sensing element of claim 12 wherein:
the first diameter is larger than a fourth diameter between a first portion of the first cathode and a second portion of the first cathode.

18. The sensing element of claim 12 wherein:
the first electrochemical cell and the second electrochemical cell are attached by an adhesion layer comprising at least one polymeric layer.

19. The sensing element of claim 12 wherein:
the housing has a first end comprising an elastic membrane and an opposed second end comprising an elastic membrane.

20. The sensing element of claim 12 wherein:
the electrolyte comprises an iodine-iodide electrolyte.

* * * * *